Jan. 22, 1963

H. J. MARTIN 3,074,267

SHEET TESTING DEVICES

Filed July 31, 1957

Inventor
Hans J. Martin

United States Patent Office 3,074,267
Patented Jan. 22, 1963

3,074,267
SHEET TESTING DEVICES
Hans Joachim Martin, Jena, Germany, assignor to VEB Carl Zeiss Jena, Jena, Germany
Filed July 31, 1957, Ser. No. 675,497
1 Claim. (Cl. 73—67.5)

This invention relates to sheet testing devices using supersonic radiation.

With a view to detecting laminations in sheets or plates, devices have been used in which supersonic radiations are continuously directed through the test object and thereafter picked up and in one way or another recorded by a receiver, the recorded intensity being a measure of the energy that has passed through the test object. Homogeneous material will produce comparatively strong indicator deflections, on the contrary however laminations are known to weaken or completely to impede the passage of sound waves. The transmitting and receiving elements used in this case are, generally, round quartz discs in closest possible mechanical contact with the object on which they travel. Even when employing coupling liquids, it is not always possible to avoid damages to the expensive quartz discs or to the diaphragms or foils connected to these discs. The water used as coupling liquid in sheet testing after the rolling process often evaporates on the sheet, which is still hot.

It is well known that these disadvantages can be overcome by using tubular hard-metal cuffs with rounded-off lower ends pressing against the sheet conveyed below them. The cuffs are filled with water, which is the coupling liquid between the sheet and the quartz. It is not, however, possible to make a system of this kind sufficiently water-tight as to prevent water from leaking out while the sheet travels past. Moreover, the pick-up velocity is restricted to fractions of a meter per second.

The present invention aims at obviating these drawbacks and providing a device for testing sheets by means of supersonics, particularly in rolling mills.

According to the present invention, rollers of piezo-electric ceramic material, for instance barium titanate, are so disposed as transducer on the one and as sound receiver on the other side of the sheet to be tested as to be in contact with and to roll on the travelling sheet. When applying cylindrical rollers of barium titanate, an addition of lead titanate will make these rollers assume a somewhat higher Curie temperature. The rollers are in this case so arranged that their axes are parallel to the plane and roll exactly opposite to each other on the two sides of the sheet. The transmitting roller may contact for instance the upper, and the receiving roller the lower side of the sheet. Subsequently to radial polarization, the exterior surfaces of the barium titanate cylinders, which usually have a burnt-on silver layer, are conveniently covered with a coupling layer of good temperature stability and sound conductivity. This coupling layer, which may consist for example of synthetic rubber or resin, ensures an elastic coupling of the sheet surfaces to the transmitter and the sound receiver and at the same time avoids the disadvantages of the coupling methods known so far, in which, for instance, hard-metal contact sleeves exert considerable spring pressure on the sheet. Rollers of piezo-electric ceramic material permit practically any pick-up velocity. In accordance with a further feature of the invention a plurality of rollers may be disposed in parallel in such a manner that pick-up rollers are distributed over the entire breadth of the quickly moving sheet, any spot of which can be tested.

The testing accuracy and, accordingly, the resolving power, i.e. the smallest space between two flaws, depends on the line of contact of roller and sheet. The herein described method permits a good recording accuracy or, in other words, a good resolution, in the direction of rolling. With small rollers, tests are possible down to a few millimeters. In the lateral sense, the resolution depends on the breadth of roller. A breadth of 15 to 20 millimeters will be sufficient in most cases.

The device according to the invention may have a receiver comprising in the known manner, in addition to an amplifier, a rectifier and a robust recording instrument. It may be that a definite thickness of the sheet to be tested causes a standing wave when the thickness $d$ corresponds exactly to the condition $d = n \cdot \lambda/2$. In this case, the resonance of the standing wave will cause a particularly strong deflection and the instrument will, at least, give unsteady records or oscillate about a definite point of rest. This disadvantage can be avoided, according to a further feature of the invention, by disposing instead of one pair of rollers two such pairs in series in the direction of motion of the sheet, and using a circuit and recorder, in which the voltages generated by the two receiving rollers cancel each other when the homogeneity of the sheet under examination is undisturbed at the respective places, so that the recorder is actuated only when the structure of one measured spot differs from that of another such spot.

The invention will now be described with reference to the accompanying drawing which represents diagrammatically and by way of example two embodiments of the device according to the invention.

Figure 1:
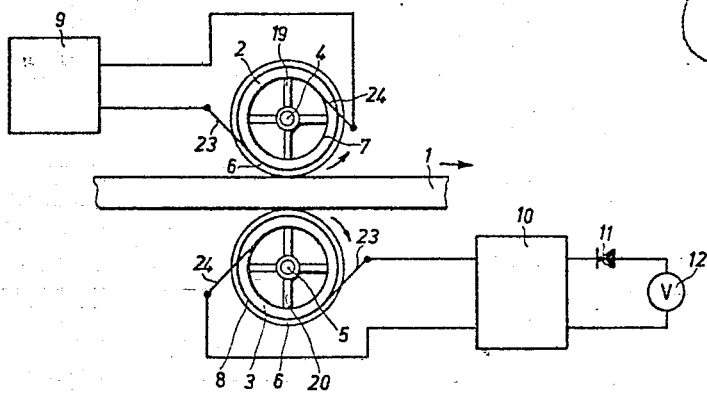
FIG. 1 shows an arrangement in which the hollow cylindrical transducers according to the invention are used in a rolling mill for metal sheets.

In FIG. 1 a sheet 1 to be tested is conveyed, for instance, in a rolling mill in the direction of the arrow. On either side of the sheet 1 are rollers 2 and 3, respectively, which are opposite to each other. These rollers are of piezo-electric ceramic material, for instance barium titanate, and constitute hollow cylinders the interior and exterior surfaces of which are lined with burnt-on metal constituting electrodes 7 and 8, respectively. The two rollers which are supported by spokes 19, 20 and naves 21, 22, respectively, are rotatable about axes 4 and 5. For the protection of the burnt-on metal layer 8, which may be of silver, they are covered with elastic coupling layers 6 of good temperature stability and sound conductivity, as for example synthetic rubber or resin. As the coupling layers 6 are in contact with the sheet 1, the rollers are rotated in the direction of the arrows when the sheet is being conveyed.

The side-faces of the electrodes 7 and 8 of the roller 2 constituting a transducer are electrically connected to an ultrasonic generator 9 by means of sliding contacts 23 and 24. The ultrasonic rays travelling from roller 2 through the sheet 1 are received by roller 3. The electrodes 7 and 8 of the receiving roller are likewise electrically connected to an amplifier 10. The output voltage of the amplifier 10 is supplied through a rectifier 11 to an indicating instrument 12.

Figure 2:
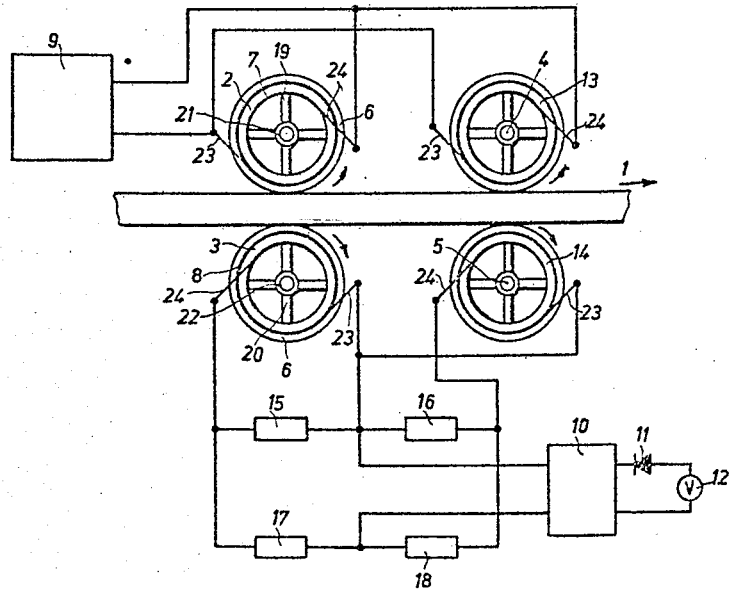
FIG. 2 shows another rolling mill which has two pairs of hollow cylindrical transducers.

FIG. 2 shows an embodiment of the invention employing two pairs of rollers 2, 3 and 13, 14, respectively. Whilst the exterior electrodes of the receiving rollers 3 and 14 are electrically connected to each other, the potentials derived from the interior electrodes are supplied to a bridge circuit 15, 16, 17, 18. The output voltage of this bridge circuit is measured as in the example of FIG. 1 by means of the amplifier 10, the rectifier 11 and the indicating instrument 12. The indication of the instrument 12 will be zero when the thickness of the sheet 1 between the rollers 2 and 3 equals that between the rollers 13 and 14.

I claim:

An arrangement for testing sheets in rolling mills by means of ultrasonics, comprising a source of electric oscillations, two pairs of rotatable hollow cylindrical transducers, circuit means and an indicating device, each of said transducers being a hollow cylindrical roller of piezoelectric ceramic material, the interior and exterior surfaces of said roller being coated with metallic electrodes, the surface of said exterior electrode being coated with a coupling layer of good sound conductivity and good temperature stability, said pairs of transducers being arranged in series in the direction of motion of the sheet to be tested, the transducers of each of said pairs being so disposed opposite to each other on either side of the sheet to be tested as to be in rolling contact with said sheet, one of the transducers of each pair being electrically connected by means of said electrodes to said source of electric oscillations for sending ultrasonic waves through said sheet, the other of the transducers of each pair being electrically connected to said circuit means for comparing and producing a signal indicative of any difference in the signals produced by said other transducers, said indicating device being connected to the output of said circuit means to indicate said difference.

References Cited in the file of this patent
UNITED STATES PATENTS

| | | |
|---|---|---|
| 2,545,101 | Meunier | Mar. 13, 1951 |
| 2,612,772 | McConnell | Oct. 7, 1952 |
| 2,666,862 | Branson | Jan. 19, 1954 |
| 2,724,783 | Renaut | Nov. 22, 1955 |
| 2,906,991 | Camp | Sept. 29, 1959 |